3,241,921
CONTINUOUS LIQUID TREATMENT APPARATUS
Andrés Ferrari, Scarsdale, N.Y., assignor to Technicon Instruments Corporation, Chauncey, N.Y., a corporation of New York
Filed July 12, 1961, Ser. No. 123,525
8 Claims. (Cl. 23—253)

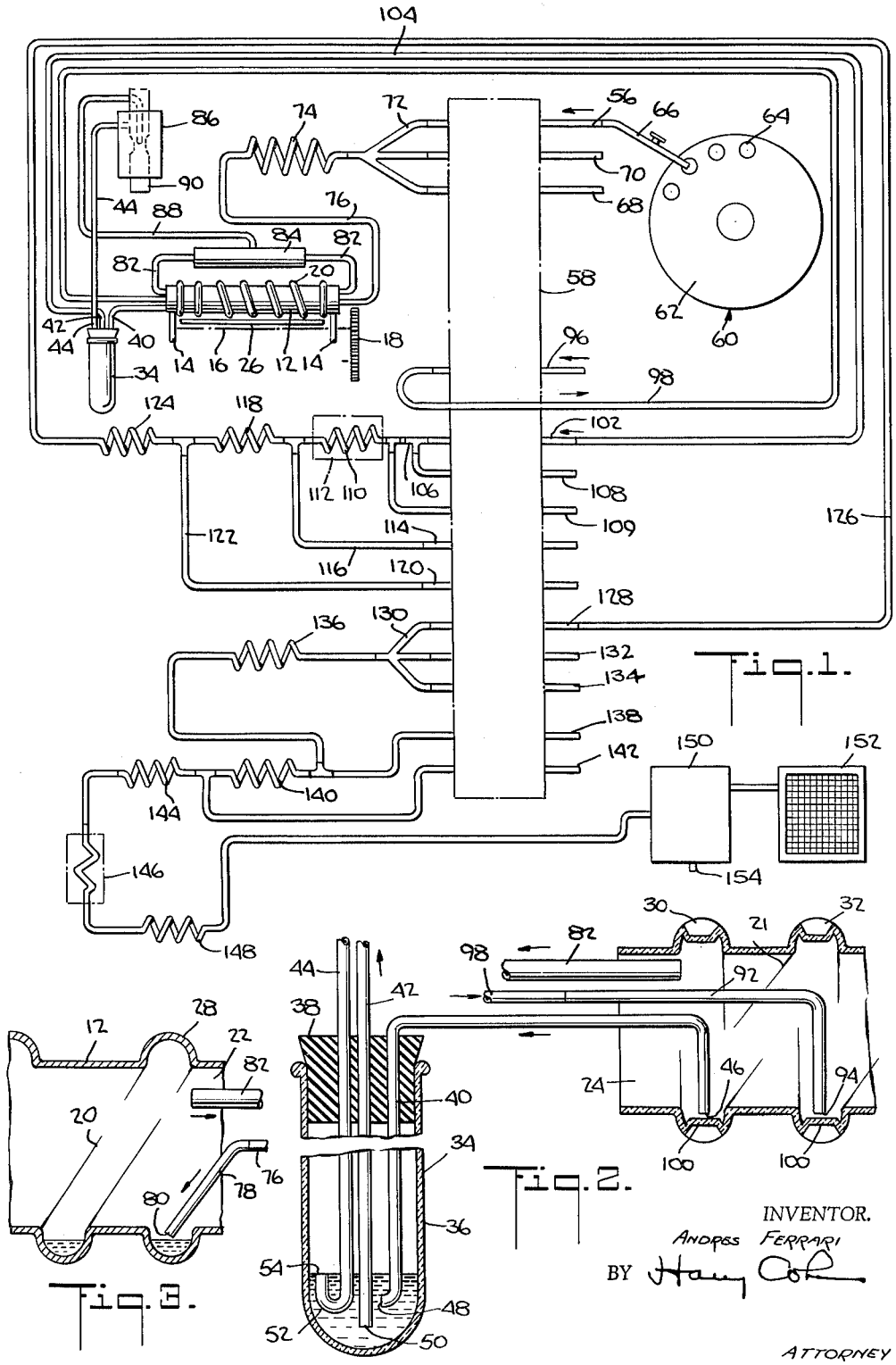

The present invention relates to a continuous liquid treatment apparatus and method and, more particularly, to a continuous digestion method and apparatus which, while useful for various purposes, is intended primarily for performing Kjeldahl types of total or partial nitrogen determinations.

In my prior United States Patent No. 3,020,130 issued February 6, 1962 and Patent application Ser. No. 112,590 filed May 25, 1961, there is disclosed a method and apparatus for digesting substances under investigation in a continuous manner and treating the digested substances for analysis. As described in said applications, prior to my invention Kjeldahl type of nitrogen determinations were performed on one sample at a time in a discontinuous or batch process and required, for each determination, complicated and expensive apparatus and procedures and the use of many articles of glassware and auxiliary apparatus.

According to my above mentioned applications and patent and pursuant to the present invention, in performing nitrogen determinations, the material whose nitrogen content is to be determined and an acid, for example sulfuric acid for digesting the material, are introduced in the form of a liquid stream into the inlet end of a horizontal rotary vessel. The liquid is transmitted through the rotary vessel to its outlet end and is heated during its passage through said member. According to my prior U.S. Patent No. 3,020,130, issued February 6, 1962, a stream of the liquid containing the digested material is withdrawn from the rotary member at its outlet end while liquid is being introduced into the rotary member at its inlet end and the withdrawn liquid is diluted with water. Pursuant to my prior application, Ser. No. 112,590, the digested material is diluted with water while still in the rotary member and the diluted digested material is withdrawn from the rotary member at its outlet end while liquid is being introduced into the member at its inlet end. In each case the diluted digested material is treated with an alkali, for example sodium hydroxide, which neutralizes the acid content of the liquid containing the digested material and liberates ammonia which immediately goes into solution in the water forming ammonium hydroxide. The quantity of the ammonia, in the form of ammonium hydroxide, is used as a measure of the nitrogen in the sample introduced into the rotary member.

The liquid containing ammonium hydroxide is treated with alkaline phenol and sodium hypochlorite which produces a blue color in proportion to the quantity to the ammonia present in the liquid and the blue color of the liquid stream is measured in a colorimeter of the flow cuvette type. It will be understood that the digestion of the material and its subsequent treatment for analysis is accomplished in a continuous fashion in contrast to the discontinuous or batch process employed heretofore in Kjeldahl types of nitrogen determinations.

Pursuant to the present invention, the method and apparatus embody the principles disclosed in my above mentioned applications and represent further developments thereof in respect to certain features and forms of construction.

The invention will be more fully understood from the following description of the presently preferred embodiment of the invention considered in connection with the accompanying drawings which are to be considered as illustrative of the invention but not in limitation thereof.

In the drawings:

FIG. 1 is a more or less diagrammatic view illustrative of the method and apparatus of the present invention;

FIG. 2 is a vertical sectional view, on a larger scale, of part of the apparatus; and FIG. 3 is a vertical sectional view of the inlet end of the digestion vessel.

Referring now to the drawings in detail, the continuous digestion apparatus comprises a liquid heating or digestion vessel in the form of a cylinder 12 which is preferably formed of heat resistant glass. Said cylinder mounted for rotation about a horizontal access in a heating oven (not shown) and for that purpose is supported at its opposite ends by rollers 14 which are connected to each other by a horizontal rotary shaft 16. The rollers are driven by a motor (not shown) through suitable gearing 18 for rotating the cylinder about its horizontal axis. The cylinder is provided with a helical groove 20 along its inner surface coaxial with its axis of rotation so that the liquid which is supplied to the cylinder through its open inlet end 22 (FIG. 3) is caused to flow through the tube in contact with the inner surface of the lower portion of the tube toward its open outlet end 24 (FIG. 2.)

An electric heater 26 is disposed below and slightly spaced from the lower portion of the digestion cylinder for heating the cylinder and thereby heating the liquid as it flows through the cylinder from its inlet end to its outlet end. It is to be observed that the lower portion only of the digestion cylinder 12 is directly heated by the heater 26 and it is this portion of the cylinder whose inner surface is covered by the liquid which is being conveyed through the helical passage of the cylinder due to its rotation. In this regard it will be understood that the quantities of liquid which flow into and out of the cylinder are so regulated that the liquid flows only as a helical stream in the helical passage during rotation of the cylinder whereby mixing of different samples in the liquid stream during its flow through the passage is prevented and thereby prevents contamination of one sample of the stream by another.

The inlet end 22 of the cylinder 12 is provided with a continuous cylindrical groove 28 which is perpendicular to the axis of rotation of the cylinder. This groove 28 is in liquid flow communication with the helical groove 20 so that liquid is transmitted from the groove through the helical passage of the cylinder by rotation of said cylinder. The outlet end 24 of the cylinder is provided with continuous cylindrical grooves 30 and 32 which are perpendicular to the axis of rotation of the cylinder and are in liquid flow communication with each other via a helical groove 21, and groove 32 is in liquid flow communication with helical groove 20 so that liquid can be conveyed from said helical groove to groove 32 and from groove 32 to groove 30. Water or other suitable liquid for diluting the hot, concentrated liquid is introduced into groove 32 and the diluted liquid is withdrawn from the cylinder, preferably at groove 30, as hereinafter more particularly described. If desired or required, additional cylindrical grooves can be provided upstream of groove 32 and preferably adjacent thereto for adding additional diluent to the liquid and the grooves would be in liquid flow communication with each other by helical passages.

In accordance with the invention, a liquid receiver 34 is provided in fluid flow communication with the outlet end 24 of the digestion cylinder 12 and is operable, in conjunction with other elements of the apparatus, to aspirate diluted liquid containing the digested material from groove 30 of the cylinder during the rotation thereof and while liquid is being introduced into the cylinder through its inlet end 22. The liquid receiver, as herein shown, comprises a cylindrically shaped open ended vessel 36, preferably made of heat-resistant glass. The open end of the vessel is closed by a plug 38 which supports tubes 40, 42 and 44. Tube 40 is an aspirating tube and has its inlet end 46 positioned adjacent the bottom of groove 30 for withdrawing the liquid therefrom, and has its outlet end 48 positioned in the lower part of vessel 36 for delivering the withdrawn liquid thereto. Tube 42 is an aspirating tube and has its inlet end 50 below the outlet end 48 of tube 40 and is operable to withdraw liquid from the vessel in the form of a continuous stream for treatment for analysis as will be more fully understood hereinafter. Tube 44 has a U-shaped lower part 52 which has an inlet end 54 that is above ends 48 and 50 of the other tubes. Tube 44 is connected to a suitable source of a vacuum so that the pressure in vessel 36 is below atmosphere whereby the liquid receiver 34 is operable to aspirate liquid from digestion cylinder 12 into vessel 36 via tube 40. The inlet end 54 also provides an outlet for any excess liquid above the level of end 54 and the quantity of the excess liquid in vessel 36 depends upon the rates of flow of the liquids through inlet tube 40 and outlet tube 42. The flow rates are such that the inlet end 50 of tube 42 is always below the level of the liquid in vessel 36. The vertical position of end 54 may be adjusted to vary the level of the liquid in vessel 36.

The operation of the apparatus will now be more fully described. The individual liquid samples which are to be investigated or analyzed in accordance with the present invention are supplied to the pump tube 56 of a proportioning pump 58 from a sample supply device 60 which comprises a horizontal rotary plate 62 that mounts a series of receptacles or cups 64 for the different samples, respectively, the cups being preferably arranged in a circular row. Plate 62 is intermittently rotated and an off-take tube 66 is connected to the pump tube 56 and is pivotally moved in timed relation to the intermittent rotation of plate 62 for moving its inlet end into and out of each of the receptacles 64 in succession during the dwell periods of the plate. This supply device 60 may be of the construction shown and described in U.S. Patent No. 2,879,141, issued Mar. 24, 1959, to the assignee of the present application but is preferably of the construction described in the U.S. Patent 3,038,340, issued June 12, 1962, assigned to the assignee of the present application.

The proportioning pump 58, which is schematically illustrated, may be of any suitable type although it is preferably of the type described in U.S. Patent No. 2,935,028, issued May 3, 1960, to the assignee of the present application. Briefly described, the pump comprises a plurality of resiliently flexible pump tubes which are compressed progressively along their lengths for the pumping operation by the engagement therewith of a plurality of pressure rollers which move longitudinally of the pump tubes to fully close said tubes progressively along their lengths and thus propel the liquid or other fluids for transmitting them from sources of supply to points of delivery.

As herein shown, the samples to be digested are transmitted by the pump tube 56, the acid is transmitted by the pump tube 68 and air or other inert gas is transmitted by the pump tube 70. The fluids mix with each other at fitting 72 and form a segmented stream consisting of a series of liquid segments containing the sample and the acid separated from each other by a series of intervening gas segments. As explained in U.S. Patent No. 2,797,149, issued June 25, 1957, the gas segments help keep the walls of the tubular passages of the apparatus clean and prevent contamination of one sample by a preceding sample. The segmented stream passes through a horizontal helical mixing coil 74 wherein the constituents of each liquid segment are mixed together and the segmented stream is transmitted from the mixing coil, by a tube 76 to the inlet tube 78 (FIG. 3), for introducing the acid and sample mixture into the digestion cylinder 12. As best seen in FIG. 3, the outlet end 80 of the inlet tube is positioned with respect to groove 28 of the cylinder so that the egressing sample and acid mixture flows into said groove. The air segments of the introduced stream escape from the digestion cylinder through a fume venting tube 82. The outlet end 24 of the digestion cylinder 12 is also provided with a similar fume venting tube 82 and the tubes are connected to a fume exhaust manifold 84 which is connected to an aspirator 86, via conduit 88, as shown in FIG. 1. The aspirator is of a well known type which is operated by means of a stream of water for withdrawing the fumes resulting from the heating of the acid in cylinder 12 and for diluting the acid constituents of the fumes sufficiently to produce a weak acid solution which may be transmitted safely to the outlet 90 of the aspirator for disposal in a waste pipe. Tube 44 of receiver 34 is connected to the aspirator as shown in FIG. 1 to provide a convenient source of vacuum for vessel 36.

The proportioning pump 58 is operated continuously so that when the off-take tube 66 of the sample supply device 60 is not immersed in the liquid in the cups 64, air is transmitted through said off-take tube as well as through tube 70 and as acid is being continuously supplied through pump tube 68 due to the continuous action of the pump, each succeeding sample is separated from the other by an intervening air-segmented stream of acid whereby contamination of one sample by a preceding sample is eliminated or reduced to a tolerable degree. It is to be observed that due to the operation of the sample supply device 60 and pump 58, a series of separate liquid samples mixed with acid are introduced into the digestion cylinder 12 during spaced intervals of time and a stream of acid without said liquid samples is introduced into the cylinder between said spaced intervals of time whereby the liquid in the cylinder is in the form of a continuous stream comprising a series of spaced segments or portions each containing sample liquid and acid mixed therewith separated from each other by intervening segments of acid devoid of sample liquid. The intervening acid segments help keep the walls of the helical passage 20 clean and thereby prevent contamination of one sample by a preceding sample.

As the cylinder rotates, the introduced liquid stream is transmitted from the cylindrical groove 28 and flows progressively in the helical groove 20 in contact with the inner surface of the lower portion of the cylinder longitudinally thereof into the cylindrical groove 32 which is located downstream from the inlet end of the cylinder, near the outlet end 24 thereof. In the course of the passage of the liquid through the digestion cylinder 12, the digestible material in the sample which is being investigated or treated for analysis is digested by the heated acid which is in a highly concentrated condition by the time it reaches groove 32 of the cylinder.

A diluent, for example water, is introduced into the digested material in groove 32, as previously stated, by tube 92 having an outlet end 94 positioned in groove 32 so that the egressing diluent mixes with the digested material therein. The diluent is transmitted to the digestion cylinder via pump tube 96 and conduit 98. Since the digested material contains sulfuric acid in a highly concentrated condition, only a relatively small quantity of water is added to the material while it is in the digestion cylinder. Each of the cylindrical grooves 30 and 32 is provided with projecting vanes or mixing members 100 which extend circumferentially of the respective groove and are operable to mix the digested material and the diluent together.

The diluted and digested material is conveyed from groove 32 to cylindrical groove 30 by the helical groove portion 21 and is continuously withdrawn therefrom as successive portions of the liquid flow into said groove.

The sub-atmospheric pressure in vessel 36 is adjusted so that the diluted digested material is aspirated from groove 30 of the digestion cylinder very rapidly as portions of the liquid flow therein so that periodically during the flow of the liquid, inlet end 46 of tube 40 is uncovered by the liquid and is exposed to the air which flows through tube 40 into vessel 36 and bubbles through the liquid in the bottom of the vessel and thereby agitates and mixes the successive portions of the liquid which are collected in the vessel. Since each liquid sample is separated from the succeeding liquid sample by an intervening segment of acid, it will be understood that each sample is completely withdrawn from groove 30 before a succeeding sample flows therein.

Aspirating tube 42 of the liquid receiver 34 is connected to a pump tube 102, via conduit 104, and is operable to transmit the collected and mixed portions of the diluted liquid from vessel 36 in the form of a continuous liquid stream for treatment and analysis with respect to a substance in the liquid and it is to be understood that the rate of flow of the liquid from vessel 36 is such that a sample is transmitted therefrom before a succeeding sample flows therein through tube 40. As indicated previously, the flow rate through tube 42 can be the same or less than the flow rate through tube 40 and in the latter case the excess liquid is discharged from vessel 36 through inlet opening 54 of tube 44 and is discharged to waste through outlet 90 of the aspirator 86.

The liquid stream aspirated from vessel 36 through the action of pump 58 is in the form of a continuous liquid stream consisting of a series of spaced segments or portions each containing the diluted digested material of a sample separated from each other by intervening segments or portions of diluted acid. This stream is transmitted through conduit 104 and pump tube 102 to a fitting 106 where it joins a stream of air or other inert gas which is introduced through pump tube 108 is subdivide the liquid stream into a series of liquid segments spaced from each other by intervening gas segments. If desired or required, additional diluent may be added to the stream via pump tube 109.

The diluted segmented stream is cooled by passing it through a cooling coil 110 which is preferably immersed in a water cooling bath 112. After it has been cooled and an additional quantity of water is added to the liquid through pump tube 114 and conduit 116, the resulting mixture is passed through an air cooled helical mixing coil 118. An additional quantity of diluent may be added through pump tube 120 and conduit 122 and the resulting mixture mixed in another air cooled helical mixing coil 124. The cooling effect provided by the coolers, 110, 118 and 124 reduces the quantity of diluent required to a minimum so that the apparatus performs with a high degree of sensitivity. Furthermore, the use of the liquid receiver 34 as above described permits as much of the diluted sample to be used as desired and thereby increases the sensitivity of the apparatus.

The diluted and cooled liquid is transmitted from mixing coil 124 through conduit 126 and pump tube 128 to a fitting 130 where it mixes with air and sodium hydroxide which are introduced through pump tubes 132 and 134, respectively. As explained above, the air serves to segmentize the liquid stream and thereby forms a liquid stream consisting of a series of spaced liquid segments separated from each other by an intervening air segment, certain of the liquid segments containing the digested sample, acid and sodium hydroxide and other liquid segments containing acid and sodium hydroxide only. The acid and sodium hydroxide liquid segments separate succeeding samples from each other as is apparent from the description hereinabove.

The constituents of the liquid segments of the stream are mixed together in a helical mixing coil 136 and from the helical mixing coil the resulting stream joins a stream of a liquid containing alkaline phenol, one of the above-described color reagents, which is introduced through pump tube 138. The resulting stream is transmitted through mixing coil 140 and the other of the above-described color reagents, namely sodium hypochlorite, which is introduced through pump tube 142, joins the mixed stream from mixing coil 140 and the resulting liquid stream is mixed in mixing coil 144. From coil 144 the liquid passes through a heating bath 146 wherein the color is fully developed and from said heating bath the liquid passes through the cooling coil 148 and then through the flow cuvette (not shown) of the colorimeter 150 which operates a recorder 152 for recording the results of the color-depth measurement. Since the details of construction of the colorimeter and recorder are not per se part of the invention, further description of these instruments is considered unnecessary. The liquid is discharged from the flow cuvette of the colorimeter through outlet 154.

As described above, acid fumes are removed by suction from the open ends of the cylinder 12 and are thus prevented from contaminating the air in the work room or laboratory, said acid fumes being diluted with water and discharged to waste through the outlet 90 of the aspirator 86. Also, as indicated above, the overflow outlet 54 of the liquid receiver 34 discharges any excess liquid which rises to the level of said overflow outlet through the outlet 90 of the aspirator.

The method and apparatus of the present invention can be used for partial digestion of a substance under investigation when said substance is homogeneous, i.e., when it has only one source of nitrogen in its composition. In this connection it will be understood that total digestion is employed in accordance with well known practice when the substance is not homogeneous, i.e., when it includes more than one source of nitrogen in its composition and the rates of digestion of said nitrogen source are not relatively the same. Also, it will be understood that while the method and apparatus of the present invention are intended primarily for performing Kjeldahl types of quantitative analyses with respect to the nitrogen content of a substance, the principles of the method and apparatus of the present invention are not limited to such determinations and may be used for other purposes.

While I have shown and described the preferred embodiment of my invention, it will be understood that the invention may be embodied otherwise than as herein specifically illustrated or described, and that certain changes in the form and arrangement of parts and the specific manner of practicing the invention may be made without departing from the underlying idea or principles of this invention within the scope of the appended claims:

I claim:

1. Liquid treatment apparatus, comprising a first vessel for the passage of liquid therethrough, while undergoing treatment therein, and receiving means operatively connected to said first vessel for receiving treated liquid therefrom, said receiving means comprising a second vessel having inlet means for receiving liquid from said first vessel, means for producing sub-atmospheric pressure in said second vessel for inducing the flow of liquid from said first vessel to said second vessel through said inlet means, said last mentioned means comprising an outlet tube adapted to be connected to a source of suction and having one end thereof positioned at a predetermined point above the bottom of said second vessel to limit the level of liquid in said second vessel, a liquid outlet conduit connected to said second vessel for the flow of liquid from said second vessel during the flow of liquid into said second vessel, and said inlet means being operable to introduce an inert fluid into said second vessel for agitating the liquid therein, the outlet of said inlet means being disposed below said one end of said outlet tube.

2. Liquid treatment apparatus, comprising a first vessel for the passage of liquid therethrough, while undergoing treatment therein, and receiving means operatively connected to said first vessel for receiving treated liquid therefrom, said receiving means comprising a second vessel having inlet means for receiving liquid from said first vessel, means for producing sub-atmospheric pressure in said second vessel for inducing the flow of liquid from said first vessel to said second vessel through said inlet means, said last mentioned means comprising an outlet tube adapted to be connected to a source of suction and having one end thereof positioned at a predetermined point above the bottom of said second vessel to limit the level of liquid in said second vessel, the outlet of said inlet means of said second vessel being positioned below said predetermined point, a liquid outlet conduit connected to said second vessel for the flow of liquid from said second vessel during the flow of liquid into said second vessel, and said inlet means being operable to introduce an inert fluid into said second vessel for agitating the liquid therein, the outlet of said inlet means being disposed below said one end of said outlet tube.

3. Liquid treatment apparatus, comprising a first vessel for the passage of liquid therethrough, while undergoing treatment therein, and receiving means operatively connected to said vessel for receiving treated liquid therefrom, said receiving means comprising a second vessel having inlet means for receiving liquid from said first vessel, means for producing sub-atmospheric pressure in said second vessel for inducing the flow of liquid from said first vessel to said second vessel through said inlet means, said last mentioned means comprising an outlet tube adapted to be connected to a source of suction and having one end thereof positioned at a predetermined point above the bottom of said second vessel to limit the level of liquid in said second vessel, the outlet of said inlet means of said second vessel being below said predetermined point, a liquid outlet conduit connected to said second vessel for the flow of liquid from said second vessel during the flow of liquid into said second vessel, said outlet conduit being in liquid flow communication with said second vessel at a point below said outlet of said inlet means of the second vessel, and said inlet means being operable to introduce an inert fluid into said second vessel for agitating the liquid therein, the outlet of said inlet means being disposed below said one end of said outlet tube.

4. Liquid treatment apparatus, comprising a first vessel for the passage of liquid therethrough, while undergoing treatment therein, said first vessel comprising a horizontally mounted longitudinally extending rotary member having means defining a helical passage therein disposed coaxially of the axis of rotation of said member for the flow of liquid therein from a point of liquid supply to a liquid delivery point downstream from said point of supply, means for rotating said member about said axis for the flow of the liquid in said helical passage to said point of delivery, and receiving means operatively connected to said member at said delivery point for receiving treated liquid therefrom, said receiving means comprising a second vessel having inlet means for receiving liquid from said member, means for producing sub-atmospheric pressure in said second vessel for inducing the flow of liquid from said member to said second vessel through said inlet means, said last mentioned means comprising an outlet tube adapted to be connected to a source of suction and having one end thereof positioned at a predetermined point above the bottom of the vessel to limit the level of liquid in said second vessel, a liquid outlet conduit connected to said second vessel for the flow of liquid from said second vessel during the flow of liquid into said second vessel, and said inlet means being operable to introduce an inert gas into said second vessel for agitating the liquid therein, the outlet of said inlet means being below the level of said one end of said outlet tube.

5. Liquid treatment apparatus, comprising a first vessel for the passage of liquid therethrough, while undergoing treatment therein, said first vessel comprising a horizontally mounted longitudinally extending rotary member having means defining a helical passage therein disposed coaxially of the axis of rotation of said member for the flow of liquid therein from a point of liquid supply to a liquid delivery point downstream from said point of supply, means for rotating said member about said axis for the flow of the liquid in said helical passage to said point of delivery, and receiving means operatively connected to said member at said delivery point for receiving treated liquid therefrom, said receiving means comprising a second vessel having inlet means for receiving liquid from said member, means for producing sub-atmospheric pressure in said second vessel for inducing the flow of liquid from said member to said second vessel through said inlet means, said last mentioned means comprising an outlet tube adapted to be connected to a source of suction and having one end thereof positioned at a predetermined point above the bottom of the vessel to limit the level of liquid in said second vessel, the outlet of said inlet means of said second vessel being below said predetermined point, a liquid outlet conduit connected to said second vessel for the flow of liquid from said second vessel during the flow of liquid into said second vessel, said outlet conduit being in liquid-flow communication with said second vessel at a point below said outlet of said inlet means of said second vessel, and said inlet means being operable to introduce an inert gas into said second vessel for agitating the liquid therein, the outlet of said inlet means being below the level of said one end of said outlet tube.

6. Liquid treatment apparatus, comprising a first vessel for the pasage of liquid therethrough, while undergoing treatment therein, and receiving means operatively connected to said vessel for receiving treated liquid therefrom, said receiving means comprising a second vessel having an inlet tube with the inlet end thereof disposed in said first vessel to receive liquid therefrom, means for producing a sub-atmospheric pressure in said second vessel in an amount in relation to the rate of flow of the liquid in said first vessel to induce the flow of liquid from said first vessel to said second vessel at a rate of flow which periodically causes the level of liquid in said first vessel to fall below said inlet end of said inlet tube to thereby expose said inlet end to the atmosphere for introducing air into said second vessel through said inlet tube for agitating the liquid therein, said last mentioned means comprising an outlet tube adapted to be connected to a source of suction and having one end thereof positioned at a predetermined point above the bottom of the vessel to limit the level of liquid in said second vessel, the outlet of said inlet tube being disposed below the level of the inlet of said outlet tube, and a liquid outlet conduit connected to said second vessel for the flow of liquid from said second vessel during the flow of liquid into said second vessel.

7. Liquid treatment apparatus, comprising a first vessel for the passage of liquid therethrough, while undergoing treatment therein, and means operatively connected to said vessel for receiving treated liquid therefrom, said receiving means comprising a second vessel having an inlet tube with the inlet end thereof disposed in said first vessel to receive liquid therefrom, means for producing a sub-atmospheric pressure in said second vessel in an amount in relation to the rate of flow of the liquid in said first vessel to induce the flow of liquid from said first vessel to said second vessel at a rate of flow which periodically causes the level of liquid in said first vessel to fall below said inlet end of said inlet tube to thereby expose said inlet end to the atmosphere for introducing air into said second vessel through said inlet tube for agitating the liquid therein, said last mentioned means comprising an outlet tube adapted to be connected to a source of suction and having one end thereof positioned at a predetermined point above the bottom of the vessel to limit the level of liquid in said second vessel, said inlet tube having its outlet end disposed in said second vessel below said predetermined point, and a liquid outlet conduit connected to said second vessel for the flow of liquid from said second vessel during the flow of liquid into said second vessel.

8. Liquid treatment apparatus, comprising a first vessel for the passage of liquid therethrough, while undergoing treatment therein, and means operatively connected to said vessel for receiving treated liquid therefrom, said receiving means comprising a second vessel having an inlet tube with the inlet end thereof disposed in said first vessel to receive liquid therefrom, means for producing a sub-atmospheric pressure in said second vessel in an amount in relation to the rate of flow of the liquid in said first vessel to induce the flow of liquid from said first vessel to said second vessel at a rate of flow which periodically causes the level of liquid in said first vessel to fall below said inlet end of said inlet tube to thereby expose said inlet end to the atmosphere for introducing air into said second vessel through said inlet tube for agitating the liquid therein, said last mentioned means comprising an outlet tube adapted to be connected to a source of suction and having one end thereof positioned at a predetermined point above the bottom of the vessel to limit the level of liquid in said second vessel, said inlet tube having its outlet end disposed in said second vessel below said predetermined point, and a liquid outlet conduit connected to said second vessel for the flow of liquid from said second vessel during the flow of liquid into said second vessel, said liquid outlet conduit being in liquid-flow communication with said second vessel at a point below said outlet end of said inlet tube of said second vessel.

References Cited by the Examiner
UNITED STATES PATENTS

| | | | |
|---|---|---|---|
| 2,686,754 | 8/1954 | Monad | 23—286 |
| 3,020,130 | 2/1962 | Ferrari | 23—230 |

MORRIS O. WOLK, *Primary Examiner.*

ANTHONY SCIAMANNA, DELBERT E. GANTZ,
*Examiners.*